(12) United States Patent
Harmer et al.

(10) Patent No.: US 7,389,466 B1
(45) Date of Patent: Jun. 17, 2008

(54) ECC IN COMPUTER SYSTEM WITH ASSOCIATED MASS STORAGE DEVICE, AND METHOD FOR OPERATING SAME

(75) Inventors: Tracy D. Harmer, Longmont, CO (US); Curtis H. Bruner, Niwot, CO (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/374,079

(22) Filed: Aug. 12, 1999

(51) Int. Cl.
*G06F 11/00* (2006.01)
*G06F 11/18* (2006.01)

(52) U.S. Cl. .................. 714/763; 714/769; 714/770
(58) Field of Classification Search ............. 714/769, 714/763, 770
See application file for complete search history.

(56) References Cited

U.S. PATENT DOCUMENTS

| | | | | |
|---|---|---|---|---|
| 4,413,339 A | * | 11/1983 | Riggle et al. | 714/765 |
| 4,486,827 A | * | 12/1984 | Shima et al. | 710/261 |
| 4,888,691 A | * | 12/1989 | George et al. | 710/22 |
| 4,914,656 A | * | 4/1990 | Dunphy et al. | 714/710 |
| 5,271,012 A | * | 12/1993 | Blaum et al. | 714/6 |
| 5,291,585 A | * | 3/1994 | Sato et al. | 710/10 |
| 5,293,388 A | * | 3/1994 | Monroe et al. | 714/5 |
| 5,351,246 A | * | 9/1994 | Blaum et al. | 714/6 |
| 5,499,253 A | * | 3/1996 | Lary | 714/770 |
| 5,598,549 A | * | 1/1997 | Rathunde | 711/114 |
| 5,721,816 A | * | 2/1998 | Kusbel et al. | 360/53 |
| 5,737,344 A | * | 4/1998 | Belser et al. | 714/766 |
| 5,831,954 A | * | 11/1998 | Sako et al. | 369/59.25 |
| 5,974,544 A | * | 10/1999 | Jeffries et al. | 713/1 |
| 6,021,463 A | * | 2/2000 | Belser | 711/114 |
| 6,038,679 A | * | 3/2000 | Hanson | 714/15 |
| 6,182,182 B1 | * | 1/2001 | Bradley et al. | 710/100 |
| 6,192,492 B1 | * | 2/2001 | Masiewicz et al. | 710/16 |
| 6,223,321 B1 | * | 4/2001 | Nasu et al. | 714/769 |
| 6,252,961 B1 | * | 6/2001 | Hogan | 380/37 |

OTHER PUBLICATIONS

Computer Dictionary, Second Edition, Microsoft Press, 1993, definitions of "BIOS" and "Driver", p. 44, 134.*

* cited by examiner

*Primary Examiner*—Stephen M Baker
(74) *Attorney, Agent, or Firm*—Robert D. Marshall, Jr.; W. James Brady; Frederick J. Telecky, Jr.

(57) ABSTRACT

A computer system (10) and method are presented for performing ECC corrections on data contained in a mass data storage device (20). The computer system (10) has a host computer (12) having a CPU (14) and an associated mass data storage device (20). At least some ECC hardware is associated with the mass data storage device (25). A device driver (18) is associated with the host computer (12), which includes software instructions for execution by the CPU (14) for performing at least some ECC functions or instructions on data read from the mass data storage device (20).

5 Claims, 2 Drawing Sheets

ECC IN COMPUTER SYSTEM WITH ASSOCIATED MASS STORAGE DEVICE, AND METHOD FOR OPERATING SAME

BACKGROUND OF THE INVENTION

1. Field of the Invention

This invention relates to improvements in electrical computers and digital processing systems of the type having associated mass data storage peripheral memory devices, and more particularly to improvements in error correction coding methods and systems for recording and accessing data in mass data storage peripheral memory devices.

2. Relevant Background

Widely popular computer systems typically employ one or more mass data storage devices, such as hard disk drives, CD-ROM drives, DVD drives, or the like. It should be understood that although references herein for convenience may be made to hard disk drives, a preferred environment in which the invention may be practiced, it is not intended to limit the invention thereto.

Hard disk drives commonly used today have a spinning magnetic medium on which data are written in concentric data tracks, in a well-known manner. Usually the systems in which such hard disk drives are employed use error correction coding (ECC) techniques for maintaining the integrity of the data that is recorded onto and read from the drives. The most commonly used ECC techniques add redundant bits to a block of data to enable the original data to be recovered from a contaminated block. The redundant bits are usually recorded as the data is originally recorded onto the disk drive media. Examples of error codes that may be employed include a widely known parity code, or an error value code that may be derived from a logical exclusive-or of the data bits of the block that is being recorded.

In typical mass data storage device systems, when user data is to be originally stored to the mass data storage device media, the host computer sends the user data to the mass data storage device. The control electronics and firmware of the device processes the user data on the mass data storage device and writes it to the recording media of the device. As the data is written, typically a hardware circuit is used to generate a correction code that is stored with each sector of data. The correction code is then available for subsequent use by the hardware correction circuit.

When the user data is subsequently read from the media of the mass data storage device, the control electronics and firmware of the mass data storage device processes the user data. Usually, both error detection and correction are accomplished as a part of this function. This is usually done by a specific hardware circuit, which is used to check each sector of data that is read from the mass data storage device.

Although some portion of the correction done on typical mass storage devices may also be performed by firmware on the mass data storage device, it will be appreciated that the circuit hardware may be fairly extensive and typically the error detection and correcting circuitry itself is relatively complex.

If an error is found, then another hardware circuit may be used to correct the data, using the correction code that was stored with the user data when it was written, directly in the disk drive memory. The corrected data is then transferred from the disk drive to the host for use. Using this type of ECC technique, therefore, all error correction procedures are handled within the hard disk drive, and the host computer never actually "knows" whether any error correction has occurred. Thus, the host computer only receives good data from the mass data storage device.

In addition, the hardware that is associated with a particular hard disk drive is committed to the particular ECC technique that has been adopted with the particular hard disk drive. Although a large number of the ECC algorithms exist, once a particular ECC algorithm has been associated with the disk drive the algorithm cannot be changed without great difficulty.

What is needed therefore is a method and apparatus for performing ECC processes on data that is written to and read from the data medium of a mass data storage device, that does not require significant hardware to be associated with the mass data storage device, and which is sufficiently flexible to enable different error correction techniques to be easily selected and employed.

SUMMARY OF THE INVENTION

According to the invention, a large portion of the ECC functions previously handled by hardware on the disk drive assembly have been moved to the host computer. Those error correction functions are preferably implemented in software as a part of a device driver for the disk drive, and may be executed by the host CPU. A part of the ECC functions remain the responsibility of the disk drive.

More particularly, the disk drive retains the hardware to read the prerecorded data and the parity or error flag, to determine whether an error has occurred in the read data, and to generate an error code to enable the error to be corrected. After the activity of the ECC hardware of the disk drive, the data, flag, and error information are written to RAM locations of the host computer for further processing. The ECC operations performed by the host then perform the necessary data corrections in the RAM before the data is used. One of the advantages of this technique is that a large amount of the hardware that is dedicated to ECC on the hard disk drive assembly can be eliminated.

With respect to RAID type architectures in which ECC functions may be performed in a separate controller in the host, or even on a chip on the motherboard, the error correction operations can be performed in software by the host CPU. This may result in the elimination of a large portion of the ECC circuitry on the controller chip.

In light of the above, and in accordance with a broad aspect of the invention, a computer system is presented which has a host computer having a CPU and an associated mass data storage device. At least some ECC hardware is associated with the mass data storage device. A device driver is associated with the host computer, which includes software instructions for execution by the CPU for performing at least some ECC instructions on data read from the mass data storage device.

According to another broad aspect of the invention, a computer system is presented. The computer system has a mass data storage device which has a data medium and associated ECC circuitry for generating an error flag indication of the occurrence of an error in data read from the data medium and ECC codes identifying the location of the error. A host computer with which the mass data storage device is associated has at least a RAM, a CPU, and a facility for executing ECC instructions by the CPU. Execution of the ECC instructions by the host CPU corrects in the RAM the user data read from the medium, according to the ECC codes when the error flag has been generated.

According to still another broad aspect of the invention, a method is presented for operating a computer system having a host computer and an associated mass storage device. The method includes reading from the mass storage device data which has been previously processed to include an ECC code to facilitate subsequent error correction. An error in the read data is detected in hardware on the mass storage device using the ECC code, an error flag is generated identifying the error using the ECC code, and a location information is generated indicating a location of the error in the read data. The read data, the error flag, and the location information are transferred from the mass storage device to a memory in the host computer. Finally, the error is corrected under control of a CPU of the host computer.

In accordance with still another broad aspect of the invention, a method is presented for performing error correction in a computer system having a host computer and an associated mass storage device. The method includes reading from the mass storage device data which has been previously processed to include an ECC code to facilitate subsequent error correction. An error in the read data is detected in hardware on the mass storage device using the ECC code, an error flag is generated identifying the error using the ECC code, and location information is generated indicating a location of the error in the read data. The read data, the error flag, and the location information are transferred from the mass storage device to a memory in the host computer, and the error is corrected under control of a CPU of the host computer.

Thus, it is an advantage of the invention that the amount of hardware logic required for an accompanying mass storage device can be reduced through the provision of software in a host computer with which the device is associated that can perform a significant amount of the ECC functions.

This and other objects, features, and advantages of the invention will be apparent to those skilled in the art from the following detailed description of the invention, when read in conjunction with the accompanying drawings and appended claims.

BRIEF DESCRIPTION OF THE DRAWING

The invention is illustrated in the accompanying drawing, in which.

In the various figures of the drawing, like reference numerals are used to denote like or similar parts.

DETAILED DESCRIPTION OF A PREFERRED EMBODIMENT

Figure 1:
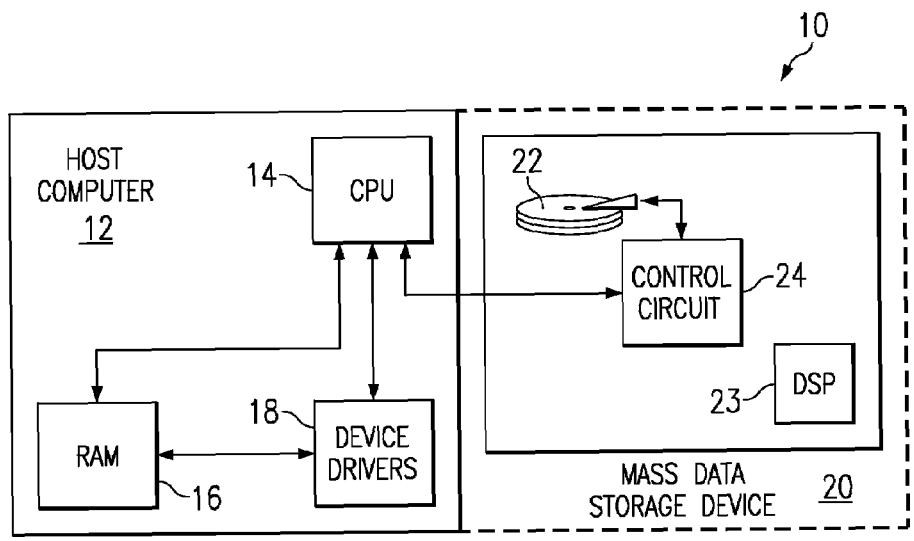
FIG. 1 is a block diagram of a computer system and associated mass data storage device, showing an environment in which the present invention may be practiced.

A block diagram of a computer environment in which the invention may be employed is shown in FIG. 1. The computer environment includes a computer system 10 having a host computer 12, which includes, among other things, a CPU 14, a random access memory (RAM) 16, and various device drivers 18. The device drivers are preferably operating system device drivers or device driver extensions; however, in some applications may be provided as system BIOS or expansion BIOS code.

Associated with the host computer 12 is a mass data storage device 20. The mass data storage device 20 may be, for example, a hard disk drive, a CD-ROM device, a DVD device, a high capacity floppy disk device, a tape drive, other magnetic recording storage device, other optical storage device, or like family of devices. The particular electrical characteristics and type of the mass data storage device 20 will determine the type and kind of device drivers 18 that need to be employed as is well-known.

A digital signal processor (DSP) 23 is typically employed to control the operation of the mass data storage device 20 and associated electronic circuitry. The mass data storage device 20 may be physically incorporated with other computer components into the physical container or chassis of the host computer 12, or may be a separate, stand alone device connected to the host computer 12 by well-known interfacing techniques, such as SCSI, PCI, IDE techniques, or the like.

The mass data storage device 20 typically includes one or more rotating disks having a recording media 22 onto which data is recorded on one or more data tracks physically located on the media. The media may be, for example, a magnetic coating or layer on a substrate that is rotated by a DC motor, or the like. Of course other types of data containing media may be equally advantageously employed, such as optical disks, or the like. It should be noted that the ECC techniques of the invention may be used in conjunction with other types of memories besides those which use magnetic data recording media, such as optical disks, or the like. Also, the invention need not be used only with mass storage devices of the type that use rotating media. For example, the techniques of the invention may be used advantageously with solid state memories, or the like.

The control of the data that is written to and read from the data media 22 is control by a control circuit 24 which contains the electronics necessary for the particular installation in which the mass data storage device 20 is employed. Typical control circuits include data amplifiers, sampling circuits, in many installations, AGC circuits, error correction coding (ECC) circuits 25, and so on, all of which are well-known in the art.

Figure 2:
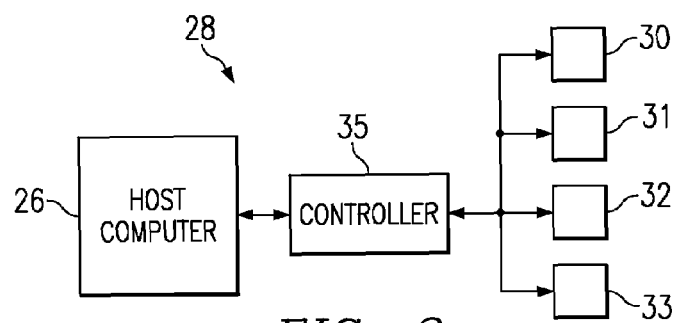
FIG. 2 is a block diagram of a computer system and associated RAID mass data storage device, showing another environment in which the present invention may be practiced.

Another environment in which the invention may be employed is that of the so-called RAID mass data storage array, as shown in the block diagram of FIG. 2. In the RAID embodiment of FIG. 2, a host computer 26 has an associated RAID mass data storage array 28 associated with it. The RAID mass data storage array 28 includes a plurality of data storage devices 30-33 which are controlled by a controller 35 which interfaces the data storage devices 30-33 to the host computer 26. As seen from the viewpoint of the host computer 26, the RAID data storage array 28 appears as a single mass data storage device, even though data may be stored on the various data storage devices 30-33 in redundant data formats, all as well-known in the art.

It should be noted that in a typical RAID mass data storage array, the controller 35 and data storage devices 30-33 are typically physically located outside of the host computer chassis, although there is no actual requirement that this arrangement be employed. In some embodiments, in fact, the controller 35 may be constructed on a printed circuit board that may be mounted or otherwise connected to the motherboard of the host computer. In either event, the controller generally contains all of the same electronic circuitry employed in a typical single mass data storage device, except that additional circuitry is employed to effect the particular RAID format used in recording data to and reading data from the plurality of data storage devices.

In the environment described above with respect to FIGS. 1 and 2, and in accordance with a preferred embodiment of the invention, at least some of the error correction coding (ECC) functions are removed from the mass data storage device 20 to be performed by the host computer 12. Preferably, the portions of the ECC functions that are performed by the host computer 12 are contained in the software or firmware of the device drivers 18. This enables the memory that formerly was used in performing the ECC functions of the control circuit 24 to be removed from the mass data storage device 20.

More specifically, preferably the system 10 is constructed with the mass data storage device 20 containing the ECC hardware necessary to generate the data integrity determination information, or other error correction signal from the data as it is initially written to the data storage medium 22. The mass data storage device 20 also contains the ECC hardware necessary to subsequently detect errors in the read back data and to generate an error flag and list of ECC codes for the errors when such errors occur in the data read back. Other embodiments may have only one or the other of these functions in hardware, with the remaining functions being performed in the host computer.

Thus, in operation, when user data is to be written to the mass data storage device 20, the host computer sends user data to be saved to the device. The control electronics of the mass data storage device 20 may contain a hardware circuit to generate a correction code that is stored with each sector of data on the media of the mass data storage device. The user data is then processed by the control electronics and firmware on the mass data storage device 20 and written to the storage media 22.

For a read operation, the user data is processed by the control electronics and firmware on the mass data storage device; however, the control electronics 24 only contains logic for performing error detection. There is no error correction capability in either the control electronics or the firmware on the mass storage device. Thus, a hardware circuit is provided on the mass data storage device 20 to check each sector of data that is read. If an error is found, the mass data storage device transfers to the device driver in the host for further processing both the uncorrected user data and the associated correction code for those sectors that have errors detected. Of course, the host now has an additional device driver capable of operating the mass data storage device 20. For sectors of user data in which the control electronics of the mass data storage device has detected an error, the device driver now corrects the user data, using the correction code for that sector.

The ECC functions are contained in the software of the device drivers. The drivers may be contained on the media of the disk and the software executed by the host CPU 14. Of course, the drivers may be contained in a memory of the host computer 12, and executed by the host CPU 14. In any event, the actual correction of data read from the data storage medium 22 is performed by the host CPU 14, not by the DSP or CPU associated with the mass data storage device 20.

Thus, in operation, as data is written to the data storage medium 22, the ECC circuitry 25 generates or computes the parity, or other error correction code signal to the associated drive 20 together with the data to be written to the data storage medium 22. This code generation may be performed in a similar manner as that function has been performed in the prior art.

When the data is to be read out from the data storage medium 22, it may be read out in a similar manner to that previously performed, i.e., by reading a plurality of sectors from the data storage medium 22. As the data sectors are read, they are processed by that portion of the ECC circuitry 25 associated with the mass data storage device 20 to determine whether an error has occurred in the read out data, using the parity or other error code that was originally written with the data when it was recorded onto the data storage medium 22. In addition, the list of the ECC codes for the errors found is determined by the portion of the ECC circuitry 25 on the mass data storage device 20.

Figure 3:
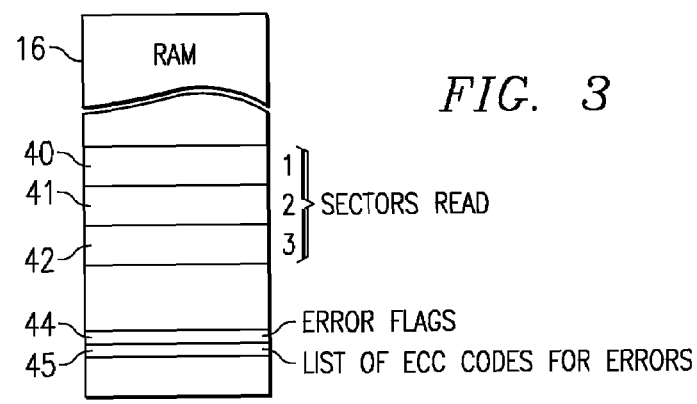
FIG. 3 is a diagram of a RAM of a host computer showing how the data read from an associated mass data storage device may be corrected in accordance with error flags and error codes also read from the mass data storage device, also contained in the RAM, in accordance with a preferred embodiment of the invention.

At this point, with reference additionally now to FIG. 3, the data sectors that have been read from the data storage medium 22 are, under the control of the host CPU 14, written into the RAM 16, for example, into sector areas 40-42. Additionally, the error flags and list of ECC codes for the errors found are also written into the RAM 16 under the control of the CPU 14 into RAM areas 44 and 45.

The host CPU 14 then executes the associated device driver software to complete the remaining ECC steps to correct the data contained in the data sector regions 40-42, using the error flags and list of ECC codes located in regions 44 and 45 of the RAM 16. The manner by which the data is corrected is similar to that previously employed in the prior art, except that the correction steps are performed by the device driver software under the control of the host CPU 14.

It will be appreciated that by relocation of the performance of the error correction steps to the host computer, and, more particularly, to the execution of the software of a device driver in the host computer, a significant number of advantages may be realized. For example, merely by removing the ECC memory from the mass data storage device 20, a significant savings in control circuitry contained in the mass data storage device can be realized. Further significant savings in the control circuitry is also realized by removing the correction functions, other than those of the initial error determination and ECC code generation described above. Furthermore, since the error correction process is determined by the software of the device drivers, which are control by the host CPU 14, the selection of any particular ECC technique that may be employed with respect to an associated mass data storage device can be easily changed more readily than if the entire ECC hardware of the mass data storage device had to be changed.

Figure 4:
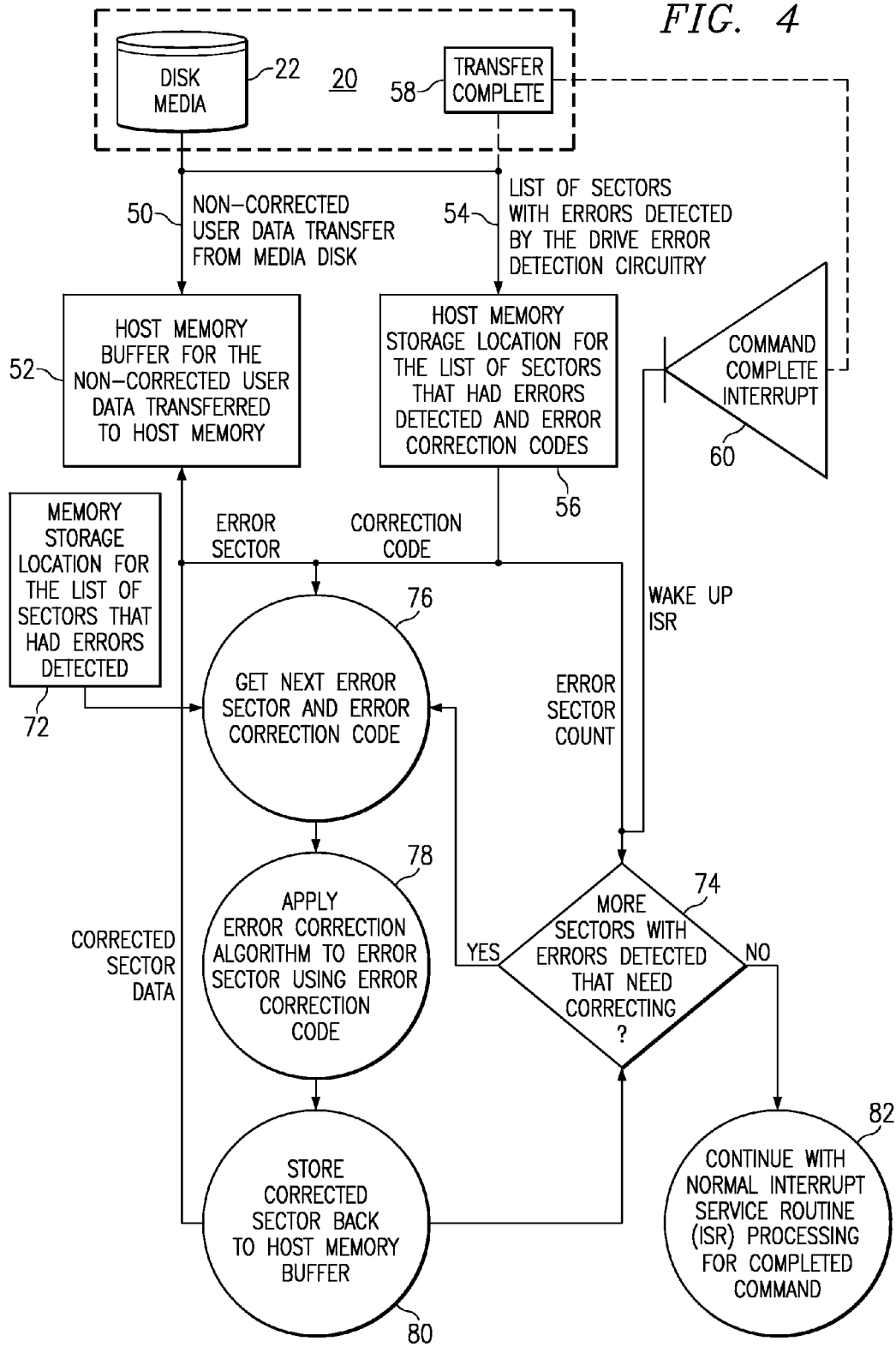
FIG. 4 is a flow chart of one embodiment of a device driver that can be used in conjunction with the hardware in accordance with a preferred embodiment of the invention, together with the data flow path resulting from the execution of the device driver software routines, also in accordance with a preferred embodiment of the invention.

A flow chart of an embodiment of a software device driver that is executed in a host computer, together with the data flow paths resulting from the execution thereof, are shown in FIG. 4. As shown non-corrected user data is transferred along path 50 from the disk media 22 of the mass data storage unit 20 to a host memory buffer 52. The host memory buffer 52 may be a separate buffer memory, or, preferably, may be a part of the RAM memory 16 of the host 12. The buffer memory 52 provides a temporary storage location for use in holding user data before and after correction during ECC processing for subsequent use.

In addition, the list of sectors that had errors detected, along with error detection codes for each sector, which have been previously written to the disk media 22 during the initial write process in which the data is written to the disk media 22, are transferred along path 54 to a second host memory buffer 56. The host memory buffer 56 may be a separate part of the host memory buffer 52, or may be a separate buffer, as shown. Both buffers 52 and 54 may be portions of the host RAM 16 allocated for buffering purposes. It should be noted that the operation of the mass data storage device 20, in usual fashion, generates a list of sectors that have errors detected, and identifies a respective error detection code for each sector that contains errors. That information is stored in a list of sectors that has detected errors, preferably in a list 72 contained in the host computer, as shown, or, alternatively, in the mass data storage device 20.

After the non-corrected user data, the host memory storage location for the list of sectors that had errors detected, and the error detection codes for each sector have been transferred to the respective host memory buffers 52 and 56, a "transfer complete" signal is provided by a circuit 58 in the mass data storage device 20. The transfer complete signal is applied to a software routine to initiate a "command complete" interrupt 60. The command complete interrupt provides, for example, a wake-up interrupt service routine (ISR) to an initial decision block 74.

Initially a determination is made in decision block 74 whether any sectors with errors that need to be corrected have been detected, and, subsequently, iteratively after the first, whether additional sectors exist with errors that need to be corrected. If so, the next sector in the host memory storage location for the list of sectors 72 is fetched in operation 76, together with the error detection code for that particular sector. The error correction algorithm is then applied to the error sector using the error correction code contained in the host memory buffer 56, as denoted by operation 78. The corrected sector is then stored back to the host memory buffer 52, as denoted by the operation 80.

If additional sectors are then determined to exist that have errors that need to be corrected in decision block 74, the process is iteratively repeated until all of the sectors contained in the memory buffer 52 which contain errors have been finally corrected. Once all of the sectors have been corrected, the process exits, as denoted by process 82, and the normal interrupt service routine for processing the completed command is executed.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

The invention claimed is:

1. A computer system comprising:
   a mass data storage device containing a data medium and having associated ECC circuitry for generating an error flag indication of the occurrence of an error in data read from said data medium;
   and a host computer having at least a RAM, a CPU, and a facility for executing ECC instructions from a BIOS by said CPU;
   wherein execution of said ECC instructions corrects in said RAM data read from said medium according to said ECC codes when said error flag has been generated.

2. The computer system of claim 1 wherein said ECC instructions are software instructions of a device driver.

3. The computer system of claim 1 wherein said BIOS is a system BIOS.

4. The computer system of claim 1 wherein said BIOS is an expansion BIOS.

5. The computer system of claim 1 wherein said ECC circuitry determines the presence of an error in said read data from data integrity determination information previously generated from said read data.

* * * * *